Aug. 18, 1936.   R. J. BURROWS ET AL   2,051,073
RAIL CAR
Filed May 9, 1932   8 Sheets-Sheet 1
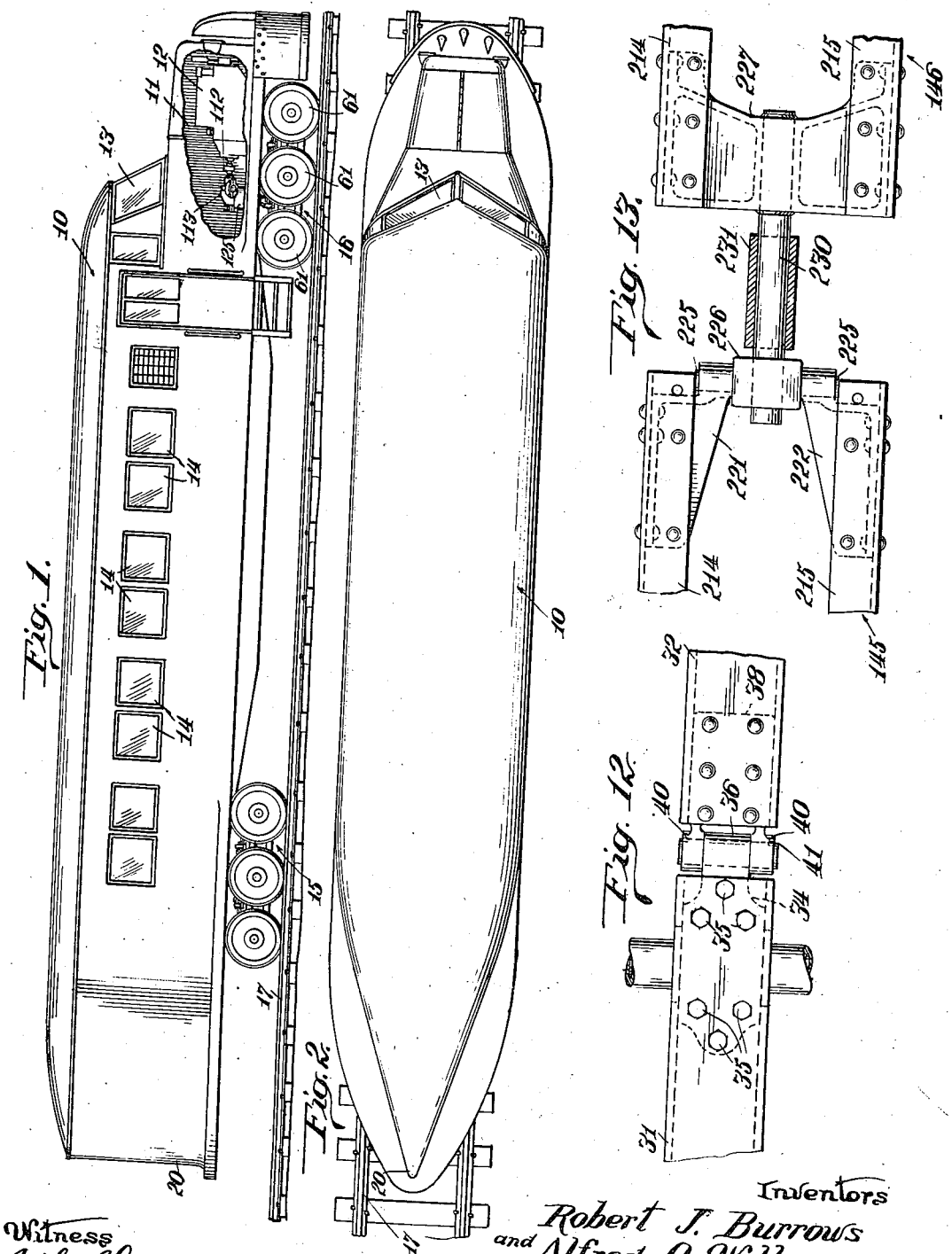
Inventors
Robert J. Burrows
and Alfred O. Williams
Attorneys.

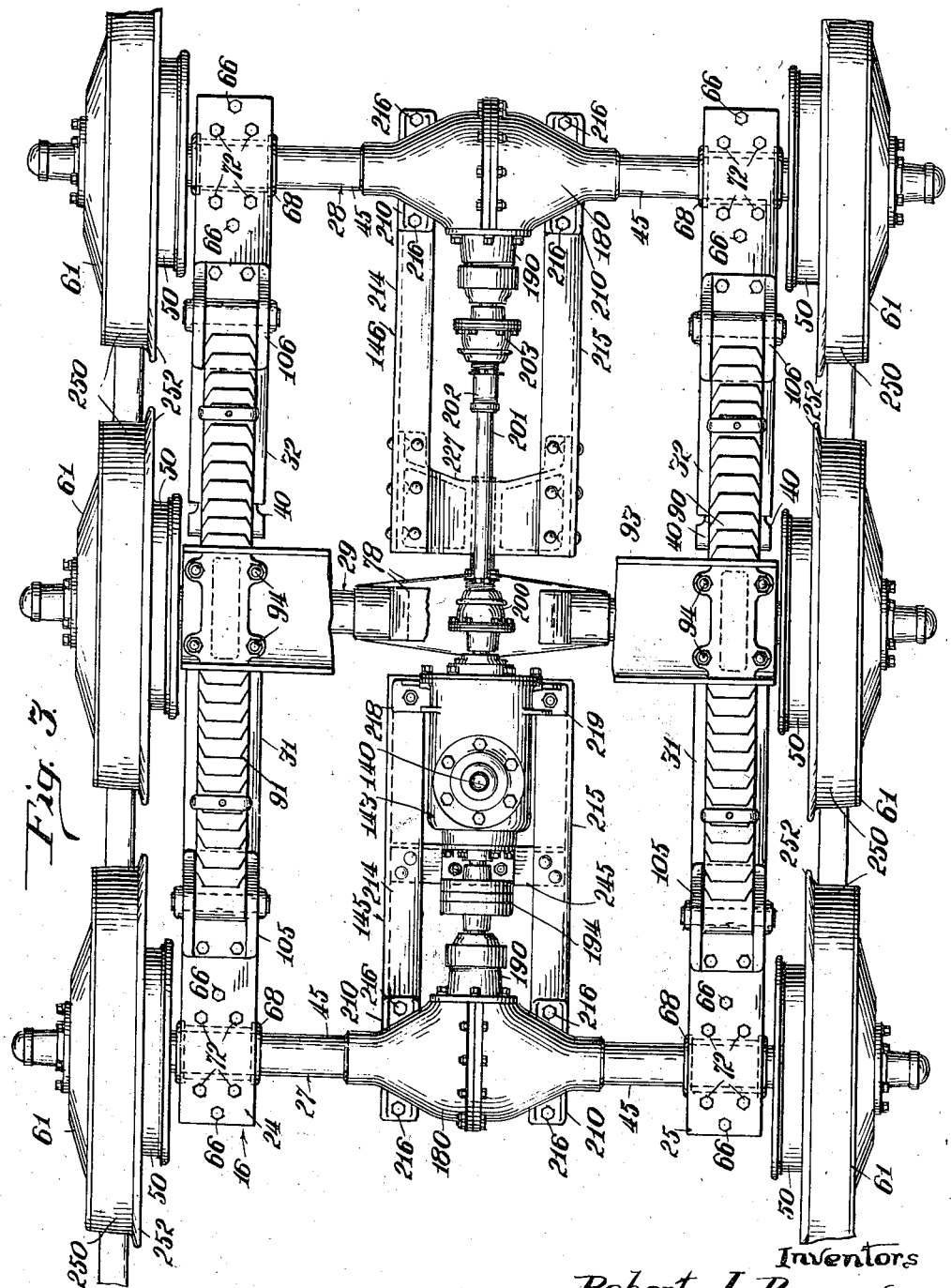

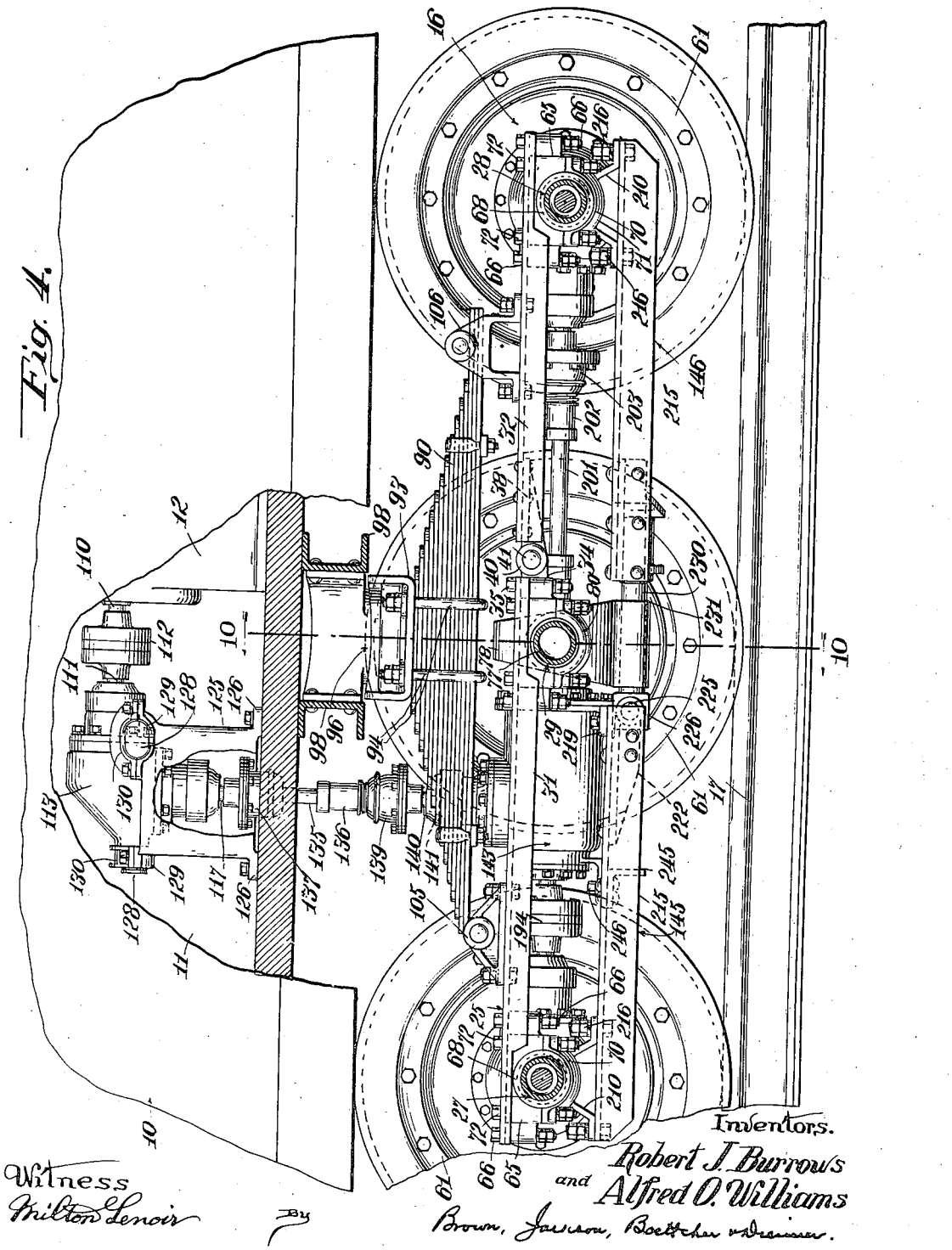

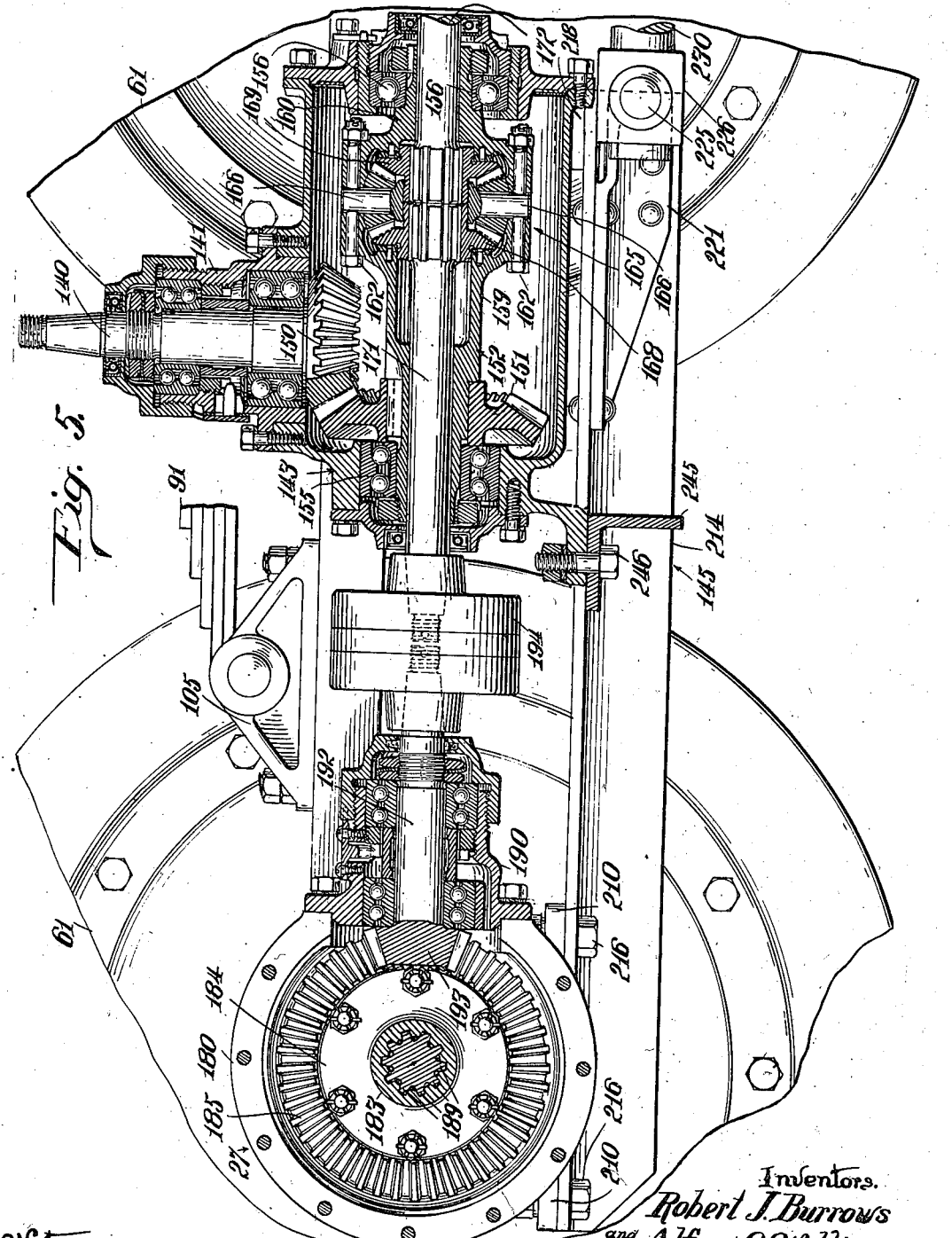

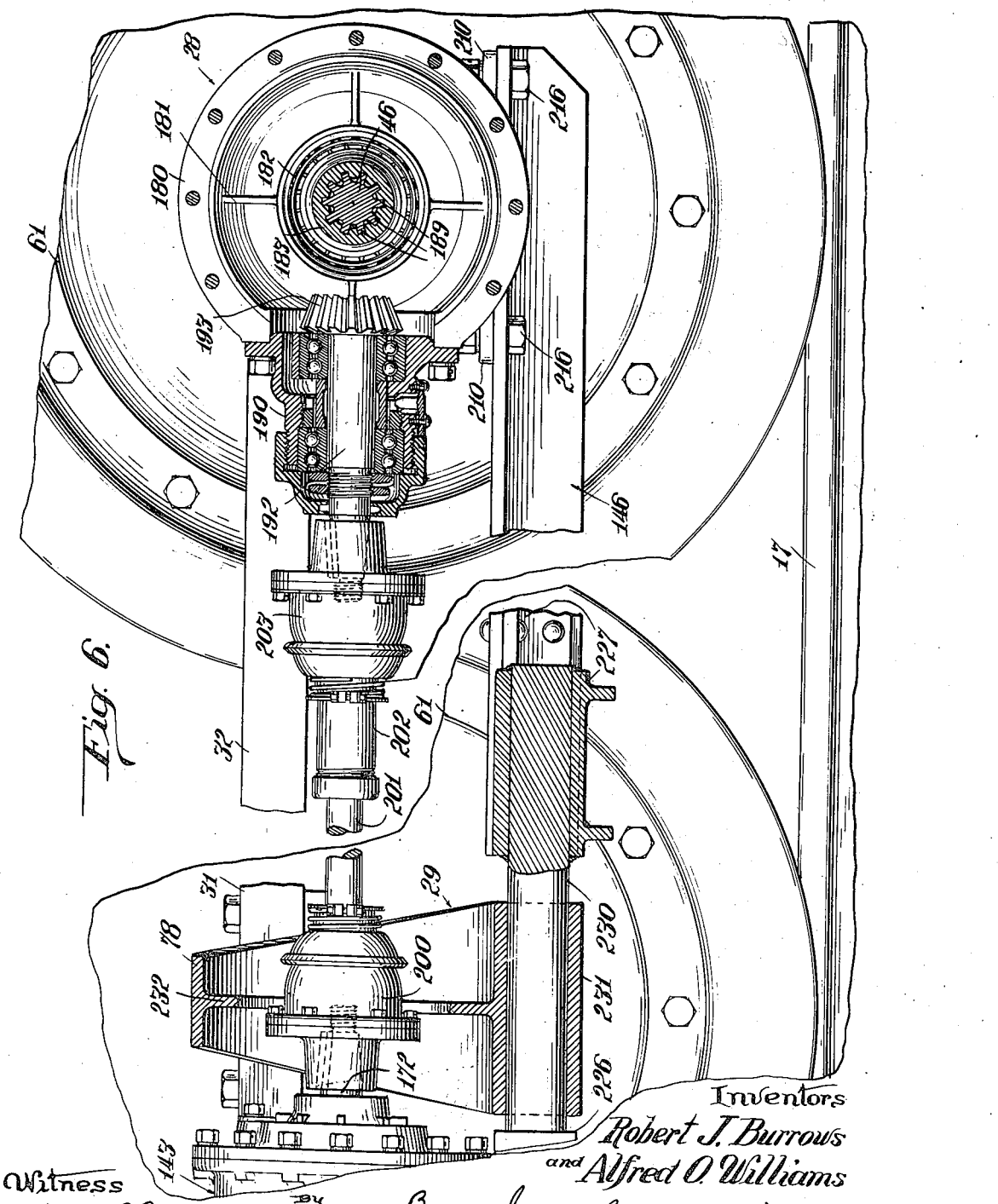

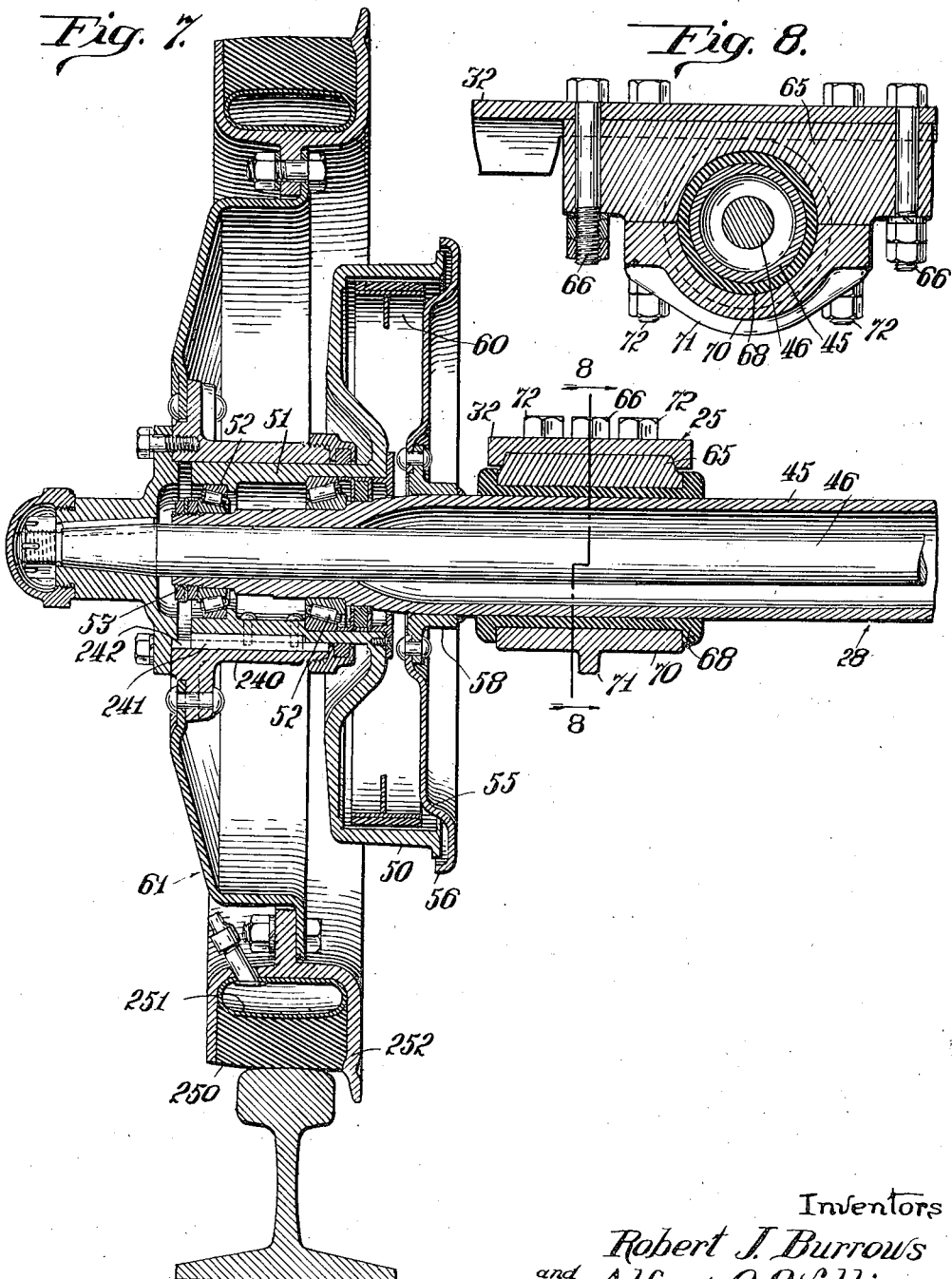

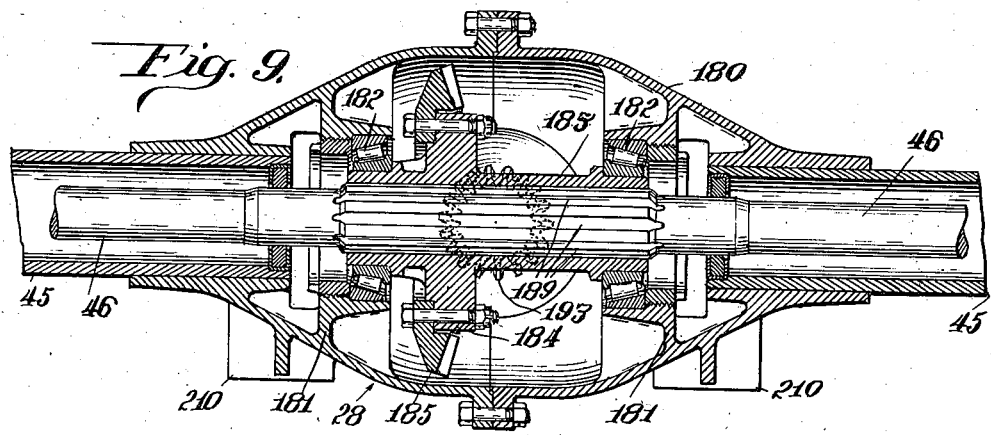
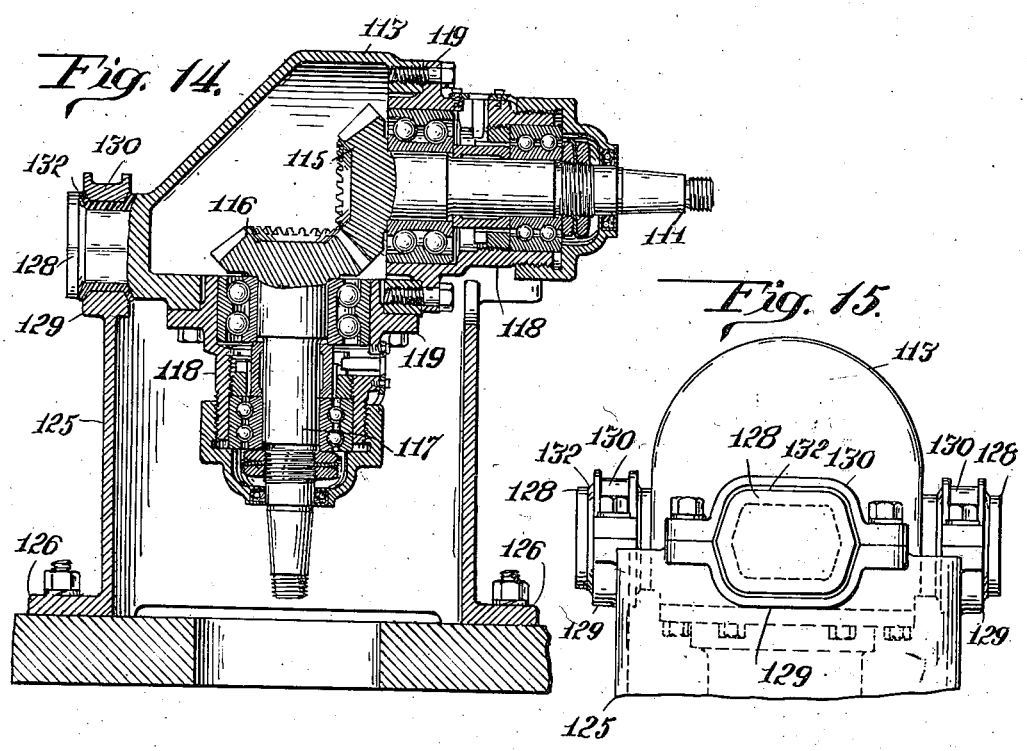

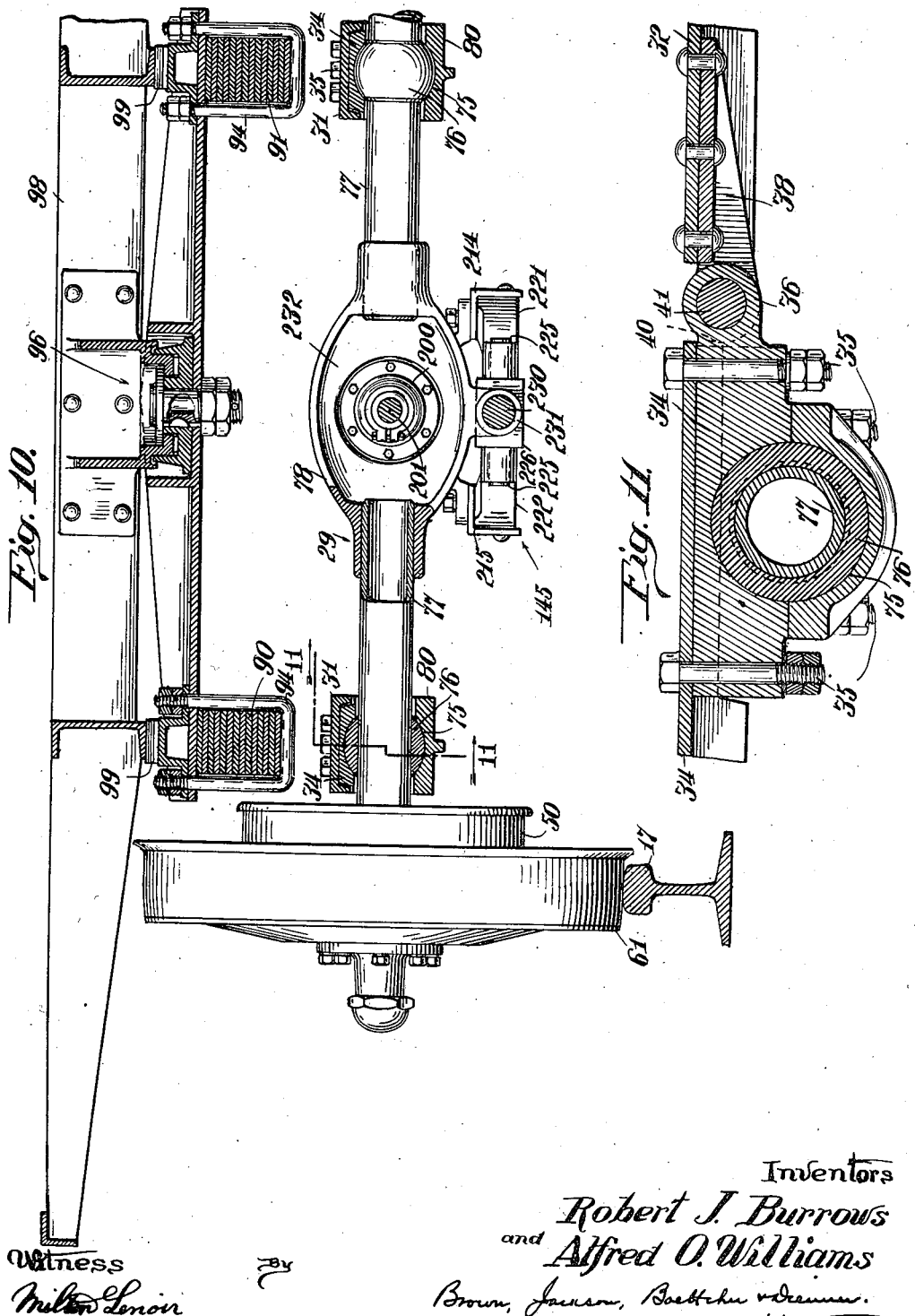

Patented Aug. 18, 1936

2,051,073

UNITED STATES PATENT OFFICE 2,051,073

RAIL CAR

Robert J. Burrows and Alfred O. Williams, Battle Creek, Mich., assignors to Clark Tructractor Company, Battle Creek, Mich., a corporation of Michigan Application May 9, 1932, Serial No. 610,079

21 Claims. (Cl. 105—118)

The present invention relates generally to light weight rail cars and the like, particularly those of the type employing rubber tired wheels or other resilient wheel construction, and has for its principal object the provision of such a rail car wherein trucks of flexible construction are employed whereby the supporting wheels are all subjected to substantially the same loading, and wherein, for the same purpose, improved driving connections between the source of power and the driving truck or trucks are provided so that the trucks may be so disposed relative to the car body that the desired equal loading on the wheels is secured.

The present invention also has for one of its objects the provision of an improved truck for rail cars and the like in which means is provided to effectively take care of all driving or braking stresses. Another object of the present invention is to provide a truck for rail cars and the like in which at least certain of the supporting wheels have limited lateral or floating movement with respect to the truck frames while supporting the weight of the truck and car body.

Still further, another object of the present invention is to provide a truck having flexibly connected sections to permit the several supporting wheels to take positions in different horizontal planes without imposing undue twisting strains or the like on the truck frames or on the car body. Still further, another object of the present invention is to provide driving means for such trucks when used as the driving truck or trucks in which the driving connections to the source of power are made without introducing undesirable angular relations between the component parts of the drive transmitting means. In this connection, the present invention also has for one of its objects the provision of differential means for transmitting the drive differentially to the several driving shafts without sacrificing clearance while still supporting the various parts of the differential means in a simple and sturdy manner.

These and other objects of the present invention will be apparent to those skilled in the art after a consideration of the following detailed description of the preferred structural embodiment which is illustrated in the accompanying drawings.

In the drawings:

Figure 1 is a side elevation of the complete rail car with part of the hood and body broken away in order to show the disposition of the power plant;

Figure 2 is a top view of the rail car shown in Figure 1;

Figure 3 is a top plan view of the front driving truck, certain parts being broken away;

Figure 4 is a side view of the driving truck shown in Figure 3, certain parts being in elevation and certain parts in section, illustrating in particular the driving connections between the power plant and the driving wheels;

Figures 5 and 6 are longitudinal vertical cross sectional views, on a somewhat larger scale, showing in detail the differential driving means for the driving axles and the torsion members associated with the driving axles and anchored to the central or intermediate axle;

Figure 7 is a transverse vertical cross section taken through one of the driving wheels and showing the means for mounting the wheels;

Figure 8 is a sectional view taken along the line 8—8 of Figure 7;

Figure 9 is a sectional view corresponding to the section of Figure 7 and illustrating, in connection with that figure, the driving connections for the driving axles whereby the latter, together with the driving wheels, have limited lateral movement;

Figure 10 is a transverse vertical section taken substantially along the line 10—10 of Figure 4, illustrating in particular the bolster construction and the construction of the central or intermediate axle and the spherical bearings by which the side frame members are carried upon the central axle for universal movement with respect thereto;

Figure 11 is an enlarged section taken along the line 11—11 of Figure 10, showing not only the frame bearings for the central axle but also the pivotal connection between the frame sections;

Figure 12 is a top plan view, on a reduced scale, illustrating the pivotal connection between the frame sections;

Figure 13 is a fragmentary view illustrating the rotatable and shiftable connecting means between the two torque arms associated with the axle housings for the driving axles and the connection between these torque arms and the sleeve carried by the central or intermediate axle;

Figure 14 is a sectional view of the bevel gear set interposed between the clutch shaft of the power plant and the vertically disposed driving shaft connected to operate the driving truck; and Figure 15 is an elevational view of the upper part of the bevel gear set as the same appears when looking forwardly relative to the rail car.

Referring now more particularly to Figures 1 and 2, it will be seen that our improved rail car comprises a streamlined car body 10 having a power plant compartment 11 in which is disposed a motor or other source of power 12, an operator's compartment 13, the usual passenger compartments lighted by windows 14 and supporting trucks 15 and 16 adapted to run on rails 17. To complete the streamlining of the body 10 the latter is preferably provided with a tapered tail 20, see Figure 2.

The trucks 15 and 16 for the rail car are practically identical except that the forward truck is usually a driving truck while the rear truck is usually a trailing truck, although both may be made driving trucks if desirable, or both may be made trailing trucks in case the rail car is a trailer and is propelled by some source of power exterior to itself. The trucks 15 and 16 are somewhat similar in their generic features to the rail car truck disclosed in U. S. Patent No. 2,036,194 issued April 7, 1936 and based upon our copending application, Serial No. 603,462, filed April 6, 1932, over which in certain details the rail car truck herein disclosed is an improvement.

Referring to Figure 3 and the following figures, the driving truck 16 will now be described in detail. As will be clear from Figure 3 the driving truck is of the six wheel type having side frames 24 and 25 supported upon the two outer or driving axles 27 and 28 and the intermediate or dead axle 29. Each side frame consists of a pair of pivotally connected sections 31 and 32, preferably in the form of channels, and the outer ends of the channel sections 31 and 32 are connected to the driving axles 27 and 28 as will be later described in detail. The inner ends of the frame sections 31 carry castings 34 secured thereto, as by bolts 35, as best shown in Figures 4, 11 and 12. One end of each of the castings 34 extends beyond the rear end of the frame section 31 and is reduced in width to form knuckles 36. The adjacent inner ends of the companion frame sections or channels 32 carry castings 38 riveted or otherwise secured thereto and provided with lugs 40 adapted to embrace the knuckles 36. Pins or pintles 41 are passed through the pairs of lugs 40 and the associated knuckles 36 and serve thereby to pivotally connect the frame sections.

The two driving axles 27 and 28 and the dead axle 29 include housings journaled in the side frames 24 and 25. In order to provide the required flexibility in conjunction with the articulated frame members and to permit the independent vertical movement of the supporting wheels, the frame members 24 and 25 are supported upon the intermediate wheel axles 29 by spherical bearing means to permit relative universal movement between the intermediate axle and the frame members, as best shown in Figure 10, while the driving axles 27 and 28 have cylindrical bearings upon which the outer ends or frame members 24 and 25 are mounted, as best shown in Figures 7 and 8. Referring now more particularly to Figures 7 and 8, it will be seen that the driving axle 28 comprises an axle housing 45 and an enclosed axle shaft 46. The axle housing 45 extends laterally outwardly beyond the side frames and is reduced in diameter to afford a bearing support for a brake drum structure 50. The brake drum 50 includes a hub 51 journaled on the outer end of the axle housing 45 by anti-friction means 52 shown, in the illustrated embodiment, as being in the form of tapered roller bearings. Lock nuts 53 are provided to maintain the bearings and the brake drum 50 in proper lateral position on the axle housing 45. Each outer end of the axle housing 45 also carries a stationary support or shield 55 having its radially outer portion curved out of the general plane thereof, as indicated in Figure 7 by the reference numeral 56, so as to embrace the edge of the brake drum 50. The support or shield 55 is anchored to the axle housing 45 by means of a collar or hub 58 to which the stationary support 55 may be secured as by riveting or the like. Preferably, the hub or collar 58 is rigidly secured to the housing 45 by brazing, welding or the like. Disposed within the brake drum 50 in operative relation with respect thereto is a brake shoe structure indicated in its entirety by the reference numeral 60. The brake shoes 60 are adapted to be expanded outwardly into frictional engagement with the interior surface of the brake drum 50 in the usual manner to brake the wheels of the truck. As best indicated in Figure 3, all of the wheels, indicated by the reference numeral 61, are provided with brakes 50 substantially identical with the brake construction indicated in Figure 7. While Figure 3 shows the driving truck it will also be understood that the trailing truck may, and preferably does, have brakes of the identical construction indicated in Figure 3 and in Figure 7.

As mentioned above, the axle housings forming a part of the driving axles 27 and 28 are provided with bearings upon which the side frames 24 and 25 are supported to provide for relative rotation or rocking movement of the axle housings with respect to the side frames 24 and 25. In Figures 7 and 8 the bearing construction is shown in detail. The bearing consists of a block or casting 65 secured to the outer end of the frame section 32 by bolts 66 passing through the ends of the bearing block 65. A bearing collar or bushing 68 is secured to the axle housing 45 in any desired manner, and as indicated in Figures 7 and 8 the bushing 68 is cylindrical in formation and fits within the semi-cylindrical bearing portion of the block 65. A cap 70 having a reenforcing rib 71 is secured to the underside of the bearing block 65 and serves to retain the bushing 68 in its bearing. The cap 70 is held in place by four bolts 72 which pass through the bearing block 65 and the end of the channel 32, and thus cooperate with the bolts 66 in securing the bearing to the frame section.

The other driving axle 27 and the opposite ends of the side frames 24 and 25 are practically identical in construction with the driving axle 28 described, not only as regards the driving axle and brake structure per se but also the bearing structure. It is to be understood that while we have shown the bearings for the ends of the side frames 24 and 25 on the front and rear driving axles as being cylindrical in formation, other types of bearings may be provided if desired. For example, instead of being cylindrical the bearings may be spherical or the equivalent, affording a very flexible rail car truck.

As far as flexibility is concerned, the rail car truck of the present invention is made flexible by virtue of the articulated frame members and the spherical bearings by which these members are supported upon the central or intermediate axle. Referring now more particularly to Figures 10 and 11, it will be seen that in the illustrated embodiment the intermediate axle 29 is not a driving axle but is merely a dead axle having journaled at its outer ends the supporting wheels 61. The side frames, as mentioned above, are supported upon the intermediate axle 29 by means for spherical bearings by virtue of which the axle 29 has rocking or universal movement with respect to the frame members. The bearings associated with the intermediate axle 29 are quite similar to the bearings for the driving axles described above. The frame sections 31 have secured thereto the castings 34, as described above in connection with the pivotal articulation of the side frames 24 and 25. The castings 34 are also utilized as bearing blocks having the semi-spherical bearing portion 75 to receive the spherical bushing 76 secured to the tubular sections 77 forming with the central yoke 78 the intermediate axle. The bearing blocks 34 form the upper half of the bearings for the intermediate axle, and caps 80, similar in form to caps forming a part of the bearings for the driving axles 27 and 28, form the lower half of these bearings. The caps 80 are constructed to receive the spherical bearing bushings 76.

By virtue of this construction each of the supporting wheels 61 may have vertical movement more or less independent of the other wheels without imposing undue twisting strains on the framework of the truck as a whole. Not only does this construction permit the truck to operate silently and smoothly over uneven road beds and irregular rails, switches and the like, but also it permits one wheel to be raised sufficient to allow the flange of the wheel to clear the rail, thereby permitting the tire thereof to be easily and quickly dismounted.

This flexibility arises because, first, of the articulated frame sections 31 and 32 which, being pivoted together, permit one section to be raised relative to the other and, second, because of the spherical bearings by which the frame sections are supported on the intermediate axle. For example, when either an end wheel or a central wheel is raised one frame section is moved angularly with respect to the companion frame section about the transverse axis of the pivotal connection therebetween and, also, the frame sections are twisted slightly about a longitudinal axis. By virtue of the spherical bearings for the intermediate axle the bearing support at this point does not in any way restrict or localize the twisting but allows the same to be distributed along the entire length of the entire frame member. For full flexibility the bearings for all of the axles may be made spherical but we have found that where the intermediate axle is carried upon spherical bearings satisfactory operation is secured.

As more clearly pointed out in our copending application, mentioned above, the flexible construction is of especial importance where the weight of the car body is to be imposed equally upon all of the supporting wheels. For this purpose we preferably employ semi-elliptic springs 90 and 91 having their central portions secured to a truck bolster 93 by means of U-bolts 94. At its center the truck bolster 93 is provided with the conventional king pin construction, indicated in its entirety in Figure 10 by the reference numeral 96. By this means the car bolster 98 is supported centrally upon the truck bolster 93. Suitable side bearings 99 are provided and are adapted, in the usual manner, to prevent excessive sidewise rocking of the car body relative to the truck bolster 93.

The ends of the semi-elliptic springs 90 and 91 are disposed in the vertical longitudinal planes of the frame members 24 and 25 and are connected to the frame sections 31 and 32 in such a manner in the preferred embodiment that substantially equal loads are imposed upon the wheels of the truck. For this purpose the connections between the ends of the springs 90 and 91 and the frame sections are disposed in the neighborhood of two-thirds of the distance between the intermediate axle and the front and rear axles.

Specifically, the connections between the ends of the springs 90 and 91 and the frame sections 31 and 32 are more or less representative of the conventional construction, particularly constructions of the type where driving and braking thrusts are transmitted from the driving wheels to the car body through the springs. The ends of the springs to which the driving and braking thrusts are transmitted are pivotally secured to spring brackets 105 while the opposite ends of the springs are supported upon similar brackets 106 for relative sliding movement to take care of the flexing of the springs.

Mention has been made above that the front and rear axles are driving axles while the central or intermediate axle is a dead axle. The means for transmitting power to the driving axles will now be described. Referring for the moment to Figure 4, it will be observed that the car body 10 carries the power plant 12 and that power is transmitted therefrom to the driving truck 16, the front axle of which is practically directly underneath the power plant 12. The latter includes a longitudinally disposed shaft 110 which drives a shaft section 111 through a flexible coupling 112. The shaft section 111 is journaled for rotation in the housing 113 of a bevel gear set, and at its rear end the shaft section 111 is provided with a bevel gear member 115 which meshes with a companion bevel gear member 116 carried at the upper end of a vertically disposed shaft section 117 also journaled in the bevel gear housing 113. It will be noted from Figure 14 that the shaft sections 111 and 117 are practically identical, with the exception that one is disposed longitudinally in a horizontal plane while the other is disposed vertically. Each of these shaft sections is supported by anti-friction bearing means in a bearing sleeve 118 which includes a flange 119 by means of which each bearing sleeve is bolted to the bevel gear housing 113.

The housing 113 is supported from the floor of the car by a suitable pedestal structure 125 provided with supporting feet 126 which are adapted to be bolted directly to the floor of the car 10. The housing 113 is not rigidly connected with its supporting pedestal 125, but preferably the bevel gear housing 113 is provided with suitable supporting lugs or bosses 128, one at the rear of the housing and one at each side thereof, and these bosses are supported in suitable brackets 129 secured to or forming a part of the supporting pedestal 125. Caps 130 serve to secure the housing 113 in place, and suitable bushings of rubber or other resilient material are interposed between the bosses 128 and the supports therefor whereby the housing 113 is resiliently supported upon the car body and capable of a limited amount of movement relative thereto.

The drive from the shaft section 117 is transmitted downwardly to the driving truck through a vertically disposed shaft construction embodying a pair of telescopic shaft sections 135 and 136, the former being connected with the shaft section 117 through a universal joint 137, as best shown in Figure 4. The lower end of the lower telescopic shaft section 136 is also provided with a universal joint 139 by which it is connected with a vertically disposed shaft section 140 carried upon the driving truck.

Referring now more particularly to Figures 5 and 6, it will be observed that the shaft section 140 is journaled for rotation in a bearing sleeve 141 and that this bearing sleeve 141 is mounted upon a casing or housing 143. This housing is suitably supported upon the driving truck in any desired manner, but preferably it is carried upon torque arms 145 and 146 having their outer ends secured to the driving axle housings 45 and their inner ends anchored to the intermediate axle 29, as will be later described in detail.

The casing 143 constitutes the differential housing and the shaft section 140 is provided with a bevel bear 150 disposed within the housing 143 and meshing with a companion bevel gear 151 suitably keyed onto a sleeve 152 mounted for rotation by anti-friction bearings 155 and 156 suitably supported in opposite ends of the housing 143. The sleeve 152 actually consists of two complementary sections 159 and 160, the former having bearing support at the rear end of the differential housing 143 and to which is secured the bevel gear 151 closely adjacent to the bearing means for the sleeve section 159. The other sleeve section 160 is journaled for rotation by the bearing means 156 at the opposite end of the differential housing 143, and the sleeve sections 159 and 160 are preferably bolted together by means of bolts 162. These frame sections are enlarged at their point of connection to form the driving member of a differential indicated in its entirety by the reference numeral 165. The differential includes the usual pinions journaled for rotation on stub shafts 166 and meshing with the two cooperating differential gears 168 and 169. Preferably, these differential gears are splined onto drive shafts 171 and 172 disposed longitudinally of the rail car truck and mounted coaxially on the sleeve sections 159 and 160 for rotation relative thereto. The bearing means for the sleeve sections also serve to support the inner ends of the driving shafts 171 and 172. It is to be noted that, where the bevel gear 151 is mounted adjacent the supporting bearings 155 at one end of the differential housing 143, the differential 165 is supported closely adjacent the other bearing means 156 in the opposite end of the differential housing 143. By virtue of this construction the parts are supported in a strong and sturdy manner since neither the driving bevel gear 151 nor the differential 165 is supported by shafts or the like which overhang the supporting bearings there for any appreciable amount. In addition, the diameter of the differential housing 143 may be made small so as to afford the proper clearance while yet disposing the differential and the associated structure substantially in the horizontal plane of both driving axles.

The largest portion of the weight of the differential housing 143 and associated structure is carried upon the torque arm 145, the rear end of which is connected directly with the rear axle housing 45. This particular construction disposes the drive shaft 171 closely adjacent the rear driving axle. As best shown in Figures 5 and 9, the forward axle housing 45 consists of two tubular sections joined together by means of a central casing 180 having interior flanges 181 affording a support for bearings 182 in which is journaled a sleeve 183. The latter is provided with a radial flange 184 to which is bolted a bevel gear 185. The sleeve 183 is provided with splines and the driving axle 46 journaled in the axle housing 45 constitutes a through axle and is provided centrally thereof with cooperating splines 189 by which rotation of the gear member 185 drives the through axle 46.

The casing 180 serves to enclose the driving gear 185 and is provided with a bearing sleeve 190, identical for all practical purposes with the bearing sleeves 118 referred to above, in which is journaled a short shaft 192 having at its rear end a pinion 193 meshing with and serving to drive the bevel gear 185. The forward end of the short shaft 192 is connected through a flexible coupling 194 with the rear drive shaft 171, as best shown in Figure 5.

The drive from the differential 165 to the rear driving axle is substantially the same as just described above in connection with the drive to the forward driving axle. The construction of the forward driving axle is identical with the rear driving axle and is identical with the structure illustrated in Figure 9, and for that reason the reference numeral 46 was utilized to indicate the through axle, and such reference numerals appearing in Figure 9 as are applicable are also shown in Figure 6. One distinction is important however, which arises from the fact that, as mentioned above, the differential housing 143 is supported in a position adjacent the rear driving axle. The purpose of this arrangement is to place the vertical drive shafts 117, 135 and 140 in a position in rear of the bolsters 93 and 98 and between the intermediate and rear driving axles. This particular construction necessitates a somewhat longer drive shaft from the differential forwardly to the forward driving axle. Further, because the differential housing 143 is supported by the rear torque arm 145 which, as will be explained in detail later, has pivotal and angular movement relative to the forward torque arm 146, it is necessary to provide for certain flexibility in the driving connections between the differential housing 143 and the forward driving axle.

Referring now more particularly to Figure 6 the forward drive shaft 172 is connected through a universal joint 200 to a telescopic drive shaft construction embodying two telescopic shaft sections 201 and 202. The shaft section 202 is connected to a universal joint 203, which, in turn, is connected to drive the forward shaft section 192. The construction including the telescopic shaft sections 201 and 202 and the universal joints 200 and 203 allow for longitudinal and lateral, as well as angular, displacement of the forward driving axle with respect to the differential housing 143.

As mentioned above, due to the mounting of the driving and dead axle housings for rotation in the side frame members 24 and 25 it is necessary to provide torsion members or torque arms to take care of the stresses developed due to driving and braking reactions. Preferably, torque arms are provided, one rigidly connected with each of the front and rear axle housings and anchored centrally of the truck to the intermediate wheel axle. For this purpose the casings 180 are each provided with brackets or bosses 210 to which the outer ends of the torque arms are securely bolted or otherwise rigidly secured thereto. The rear torque arm 145 comprises a pair of angle bars 214 and 215, their rear ends being bolted to the brackets 210, as by bolts 216, as best shown in Figure 3. The forward or inner ends of the angle bars 214 and 215 are securely bolted to oppositely disposed ears 218 and 219 secured to or forming a part of the differential housing 143. Also, the vertical flanges of the angle bars 214 and 215 are secured to a pair of castings 221 and 222, as by riveting or the like. These castings or brackets are bored to receive the pivots 225 of a swivel block 226 mounted therebetween, as best shown in Figure 13. The angle bars 214 and 215 of the forward torque arm are riveted to a casting member 227 having suitable webs and flanges to strengthen the same and a central bore in which is secured, as by welding or the like, a cylindrical bar or stub shaft 230 which is slidable and rotatable in the swivel block 226 and is also received within a sleeve 231 connected with and forming a part of the yoke 78 of the intermediate axle 29, as best shown in Figures 4 and 6. As also shown in Figure 6, the central yoke 78 of the intermediate shaft 29 is provided with a reenforcing web 232 having a central opening through which the drive shaft leading to the forward driving axle is extended.

From the above description it will be apparent that any braking or driving strains which would tend to rotate the housings 45 or the intermediate housing 77 will be resisted by the torque arm construction. While both of the torque arms 145 and 146 are anchored at their inner ends to the central or intermediate axle 29, it will be observed that the driving and braking reactions developed at the driving axles are balanced one against the other by virtue of the fact that one of the torque arms extends forwardly from the axle to which it is connected while the other torque arm extends rearwardly. Thus, where the driving reactions tend to rotate the axle housing in a direction to raise the inner end of the associated torque arm the reactions developed at the other driving axle tend to cause the rear end of the associated torque arm to move downwardly. In this manner the reactions are balanced or neutralized. The anchoring of the inner ends of both of the torque arms to the intermediate axle takes care of any inequalities in the reactions developed and also effectively resists all braking reactions developed at the intermediate axle when the brakes are applied. The pivotal and swivel connections between the two torque arms and the rotational and slidable association which these parts have relative to the yoke of the central axle provide, in connection with the articulated side frame members, a very flexible rail car truck in which all load strains are properly taken care of without excessive weight.

With respect to the driving axles, the present invention contemplates a further improvement which is worthy of special note, particularly in a rail car of the type described above. Referring now more particularly to Figures 7 and 9, the driving axles 46, as having been mentioned previously, are through axles, that is, the axles extend from one driving wheel to the driving wheel on the opposite side and the ends of the driving axle are rigidly secured to the wheels. In rail car construction it is desirable that the supporting wheels for the trucks shall be able to float laterally a limited amount so as to prevent transmitting all of the road bed inequalities to the car body. The present invention contemplates providing a construction of this sort by mounting the hubs of the driving wheels for limited lateral movement upon the hubs of the brake drums 50. We have described above how the hubs 51 of the brake drums are journaled upon the laterally outer ends of the axle housings 45. The hubs of the driving wheels, indicated in Figure 7 by the reference numeral 240, are disposed concentrically with respect to the brake drum hubs 51. The latter are provided with transverse keys 241 and the hubs 240 of the driving wheels have cooperating slots 242 to receive the keys 241. The slots 242 are longer than the keys 241 and provide an arrangement whereby the wheels 61 may have limited lateral movement on the hubs 51 of the brake drums but are nevertheless in firm driving engagement with the brake drums and with the driving shafts 46 at all times. The splined construction 189 described above provides for lateral movement of the driving shafts 46 in the associated sleeves 183, the latter being held in place by the bearings 182, as best shown in Figure 9. From that figure it will be seen that when the sleeve 183 is driven the shaft 46 is also driven but is free to float laterally in accordance with the inequalities of the road bed construction.

Since the intermediate axles 29 must be of a construction to accommodate the central longitudinally disposed drive shafts, it is preferable to provide a construction such as the yoke 78 having the central aperture to accommodate the driving shafts, rather than a construction such as that shown for the driving shafts, embodying through axles. Where the intermediate axle is a dead axle the supporting wheels and the brake drum structure may be practically the same as indicated in Figure 7, any suitable means being provided to limit the lateral movement of the supporting wheels, or if desired, the supporting wheels for the intermediate axle need not have the floating or limited lateral movement specified above in connection with the driving axles.

The operation of our improved rail car construction is believed to be apparent from the above description. The power plant 12 of the rail car may be carried forward and by virtue of the vertically disposed driving means the front driving truck may also be arranged well forward so that approximately the same weight will be imposed on the rear truck as on the forward truck. Where the power plant 12 is in the form of an internal combustion engine of the usual type, conventional transmission means may be incorporated therewith, such as the usual change gear box, in which case the drive shaft 110, see Figure 4, will be driven from such change gear means. The drive from the power plant 12 is thus transmitted to the bevel gear set 113 and from thence the drive is transmitted through the flexible telescopic drive shaft connection to the differential disposed within the differential housing 143. By virtue of the differential means therein the drive is divided differentially between the front and rear driving axles, as will be clear from a reference to Figures 5 and 6. With respect to the differential, the preferred arrangement, as shown, is such that a differential housing of relatively small diameter may be employed so that the clearance of the rail car truck is not unduly reduced. The driving bevel gear 151 of the transmission means is provided with a sturdy support, being disposed closely adjacent to the bearing means at one end of the differential housing, and may be of relatively small diameter so that too great a gear reduction will not occur.

The differential 165 is itself supported closely adjacent the opposite bearing means.

The torque arm construction 145 affords a convenient accessible support for the differential, the latter being carried upon the torque arm 145 by virtue of the oppositely disposed arms 218 and 219, see Figure 3, and the transverse angle bar 245 secured, as by riveting, to the angle bars 214 and 215 and to which one end of the differential housing 143 is bolted as indicated by the reference numeral 246 in Figure 5.

The ends of the axle housings are mounted for rotation relative to the frame members 24 and 25, and the driving and braking torque is resisted by the torque arms 145 and 146 which, as described above, are so arranged that the torque developed in one of the arms is balanced and neutralized by the torque in the other arm. The two torque arms are, however, anchored at their inner ends to the intermediate wheel axle, the connections being such that relative angular and linear displacement may take place between the torque arms, this being desirable in view of the articulated frame construction and the spherical support of the frame members on the intermediate axle.

The driving axles are through axles, affording a sturdy support for the two driving wheels associated therewith, the wheels being supported for limited lateral movement upon the hubs of the associated brake drums, the latter being mounted for rotation upon the ends of the axle housings. Preferably, although not necessarily, the wheels for the intermediate axle are fastened directly to the hubs of the associated brake drums.

We have mentioned above that the rail car truck of the above description preferably utilizes flanged wheels having treads of rubber or other resilient material. The wheel construction per se forms no part of the present invention except in so far as it is a part of the general arrangement. In Figure 7 we have shown a flanged wheel of the pneumatic type having a tread of thick rubber or the like permanently vulcanized to the side flanges of the rim and a supporting air container for imparting to the wheel resiliency and flexibility. In Figure 7, the reference numeral 250 represents the tread and 251 the inner tube or air container entirely and permanently enclosed by the tread 250 and the rim structure 252 to which the tread is permanently vulcanized. We have found that this construction not only provides for a high degree of flexibility but also is such that excessive heating of the hard rubber tread is avoided, thereby making it possible to operate rail cars of this type at high speeds which is very desirable, especially in connection with stream-lined rail car bodies and self propelled driving units.

For further details relative to the specific tire construction, reference may be had to our co-pending application, Serial No. 603,463, filed April 6, 1932.

While we have described above some of the generic features of our present invention, it is to be understood that our invention is not to be limited to the specific details shown and described, but that, in fact, widely different means may be employed in the practice of the broader aspects of our invention.

What we claim, therefore, and desire to secure by Letters Patent is:

1. A rail car truck comprising a pair of articulated side members, each member consisting of a pair of pivotally connected channels, an intermediate wheel axle carried by said side members adjacent the pivotal connections of said channels, wheel axles mounted on said side members and the outer ends thereof, and means connecting said side members with said intermediate wheel axle and providing for universal movement therebetween.

2. A six wheel truck for rail cars and the like comprising longitudinally disposed frame members each member consisting of a pair of pivotally connected sections, a transversely disposed wheel axle connected to the outer ends of each of said sections for rotation relatively thereto, an intermediate wheel axle disposed between said first mentioned axles and also connected with said frame members for rotation relatively thereto, and reaction members connected with said outer wheel axles and movably connected with said intermediate wheel axle to resist reactions developed in said axles.

3. A six wheel truck for rail cars and the like comprising a pair of longitudinally disposed frame members consisting of interconnected sections adapted for relative pivotal movement, wheel axles mounted for rotation at the outer ends of said longitudinally disposed frame members, an intermediate wheel axle disposed adjacent the pivotal connection between said sections, means connecting said intermediate wheel axle with said frame members for universal movement relative thereto, a torque member connected with each of said outer wheel axles and extending inwardly toward said intermediate wheel axles, and means connecting said torque members with said intermediate wheel axle to anchor the inner ends of said torque members to said intermediate axle.

4. A six wheel truck for rail cars and the like comprising a pair of longitudinally disposed frame members consisting of interconnected sections adapted for relative pivotal motion, wheel axles mounted on said frame members, one being intermediate the ends thereof and one being mounted at each end, said outer wheel axles each comprising an axle housing journaled for rotation with respect to said frame members, inwardly extending torsion members connected with said housings, means interconnecting the inner ends of said torsion members for relative movement about longitudinal and transverse axes, and means anchoring said connecting means to said intermediate wheel axle.

5. A six wheel truck for rail cars and the like comprising a pair of longitudinally disposed frame members, each of said frame members consisting of a pair of pivotally connected sections, a central wheel axle disposed between the ends of said frame members and adjacent the pivotal connections of said sections, outer wheel axles carried by said frame members at the ends thereof, each of said outer wheel axles including a housing journaled for relative rotation about a transverse axis on the frame members and said intermediate wheel axle including a transversely disposed axle member journaled on said frame members for universal movement relative thereto, longitudinally disposed inwardly extending torsion members connected, respectively, at their outer ends with said outer axle housings, a sleeve carried by the intermediate portion of said central wheel axle, a casting having a cylindrical bore mounted at the inner end of one of said torsion members, a torsion bar mounted in said sleeve and cylindrical bore, and means pivotally connecting the opposite end of said torsion bar with the inner end of the other torsion member for movement relative thereto about a transverse axis.

6. A driving truck for rail cars and the like comprising, in combination, articulated side frames, driving axles at the front and rear ends of said side frames, an intermediate axle connected with said side frames including a central yoke having an aperture therein, a longitudinally disposed drive shaft means extending from one driving axle to the other and passing through said yoke, and means for driving said drive shaft means.

7. A driving truck for rail cars and the like comprising, in combination, articulated side frames, each consisting of a pair of pivotally connected sections, axle housings carried by said side frames at the ends thereof, through driving axles carried by said housings, driving wheels secured to the ends of said axles, an intermediate dead axle connected with said side frames adjacent the pivotal connections between said sections, said dead axle including a centrally disposed yoke having an aperture therethrough, wheels journaled on the ends of said dead axle, and means including a drive shaft for driving the through axles passing through said yoke.

8. A driving truck for rail cars and the like comprising longitudinally disposed side frames, each consisting of pivotally interconnected sections, axle housings journaled on said side frames near the ends thereof, a through axle secured at its ends to opposite driving wheels and disposed in each of said housings, a centrally disposed dead axle connected with said side frames having supporting wheels journaled at the ends thereof, torsion members connected with both of said housings and anchored to said dead axle to resist driving and braking reactions, and driving means for said through axles including a pair of longitudinally extending drive shafts and differential means carried by said torsion members and acting to differentially drive said through axles.

9. A driving truck for rail cars and the like comprising, in combination, a pair of longitudinally disposed side frames, each consisting of a pair of pivotally connected sections, axle housings journaled in said side frames, one at the front and one at the rear thereof, an intermediate axle connected with said side frames adjacent the pivotal connections between said sections, spherical bearing means supporting the side frames on said intermediate axle, driving axles journaled for rotation in said axle housings, means for driving said last named axles, and torsion arms connected with said axle housings and shiftably anchored to said intermediate axle.

10. A driving truck for rail cars and the like comprising, in combination, a pair of longitudinally disposed frame members each including a pair of pivotally connected sections, axle housings journaled for rocking movement on said frame members near the ends thereof, an intermediate axle disposed adjacent the pivotal connections between said sections, spherical bearing means mounting said intermediate axle on said frame members for universal movement relative thereto, said intermediate axle being provided with a centrally disposed yoke having an opening therethrough, driving axles journaled for rotation in said axle housings and each including a bevel gear secured thereto intermediate its ends, wheels mounted on the ends of said axles, the wheels on said driving axles being secured thereto and journaled on the ends of said housings, torque arms rigidly connected with said housings and extending inwardly toward said intermediate axle, means anchoring the inner ends of said torque arms to said intermediate axle comprising a longitudinally disposed rod secured to one of said torque arms and having rotational and sliding movement with respect to the other torque arm and said intermediate axle, and means for driving said driving axle comprising longitudinally disposed drive shafts, each including a pinion meshing with the bevel gear on the associated driving axle, and differential means for differentially driving said drive shafts.

11. A driving truck for rail cars and the like comprising, in combination, a pair of longitudinally disposed frame members, driving axles journaled on said frame members near their front and rear ends, respectively, each of said driving axles including a gear member connected therewith, and means for driving said axles including a pair of longitudinally disposed drive shafts connected, respectively, to drive said gear members, a differential casing, the inner ends of said drive shafts being journaled therein, means supporting said casing on said frame members, differential means disposed in said casing adjacent one end thereof and arranged to differentially drive said drive shafts, means for driving said differential including a gear member disposed in said casing adjacent the opposite end thereof, and means for driving said last mentioned gear member including a vertically disposed shaft journaled in said casing.

12. A rail car truck comprising side beams, a pair of axle housings, bearing means carried by said side beams and receiving said housings for limited rotation with respect to said beams, axle shafts disposed in said housings, wheels mounted on said shafts, a longitudinally disposed torque arm rigidly secured to one of said housings and extending substantially to the center of the truck, longitudinally disposed drive shaft means connecting said axle shafts, and a transversely disposed yoke carried by the side beams and including a portion disposed below said longitudinal drive shaft means for receiving the inner end of said torque arm.

13. A driving truck for rail cars and the like comprising longitudinally disposed side frames, axle housings journaled on said side frames near the ends thereof, a through axle secured at its ends to opposite driving wheels and disposed in each of said housings, a torque arm having one end connected with one of said axle housings and terminating at its other end in a longitudinally disposed cylindrical portion, and a transversely disposed yoke having a longitudinally disposed sleeve section adapted to receive the longitudinally disposed cylindrical portion of said torque arm to restrain rotation of said one housing.

14. A driving truck for rail cars and the like, comprising longitudinally disposed side frames, axle housings journaled for limited rotation in the ends of said side frames, a through axle secured at its ends to opposite driving wheels and disposed in each of said housings, a torque arm rigidly connected at one end with one housing, means associated with the other end of said arm for transmitting the torque reactions to at least one of the side frames, and means carried by said torque arm for driving both of said through axles.

15. A driving truck for rail cars and the like, comprising longitudinally disposed side frames, a driving axle at each end of the side frames and each including an axle shaft and a rockably mounted housing, means associated with each of said housings and serving as a torque arm extending inwardly therefrom to substantially the central portion of the truck, means carried by at least one torque arm for driving the associated axle shaft, and means disposed centrally of the truck and connected with the inner end of each arm and said side frames for resisting the torque reactions imposed on said arms.

16. A driving truck for rail cars and the like, comprising side members, driving axles rockably mounted at the front and rear ends of said side members, a torque arm connected with each axle and rockably mounted with respect to said side members with said axle, longitudinally disposed shaft means connected with one of said axles and carried by the associated torque arm, means for driving said one axle comprising gear mechanism mounted on said torque arm and connected with said shaft means, means for driving the other axle, and means carried at the central portion of the truck and adapted to receive the reaction of both of said torque arms.

17. A driving truck for rail cars and the like, comprising side members, driving axles at the front and rear ends of said side members, a torque arm connected with each of said axles, longitudinally disposed shaft means connected with each of said driving axles, means for driving the longitudinally disposed shaft means associated with one of said driving axles including a gear set disposed in alignment with said shaft means and carried on the torque arm associated with that axle substantially in the plane of said driving axles, means including the other longitudinally disposed shaft means for driving the other axle, and means at the center of the truck serving to prevent vertical angular movement of both torque arms.

18. A rail car truck comprising side beams, axle housings supporting said beams, bearing means for certain of said housings providing for limited relative rocking movement of said housing with respect to said beams about a generally longitudinal axis, axle shafts disposed in said housings, wheels mounted on said shafts, a longitudinally disposed torque arm secured to one of said axle housings, and a transversely disposed yoke supported on the truck and connected with the inner end of said torque arm for pivotal movement relative thereto about generally transverse and longitudinal axes.

19. A driving truck for rail cars and the like, comprising longitudinally disposed side frames, driving axles journaled for rotation with respect to and supporting said side frames, means for driving each of said axles including a generally longitudinally disposed drive shaft, gearing connecting said shaft with the associated axle, housing means enclosing said gearing and encircling the associated axle, a section serving as a rigid part of said housing extending substantially to the center of the truck and acting as a torque arm, means supporting the drive shaft thereon, an anchoring means near the center of the truck for the inner end of said torque arm section.

20. A driving truck for rail cars and the like, comprising side members, driving axles at the front and rear ends of said side members, means serving as a rockably mounted torque arm connected with each axle, longitudinally disposed shaft means connected with one of said axles and carried by the associated torque arm means, means for driving said one axle comprising gear mechanism connected with said longitudinally disposed shaft means and mounted on said torque arm means adjacent the inner end and including an upwardly extending shaft section, and transversely disposed means carried at the central portion of the truck and pivotally connected at the inner end thereof to receive the vertical reaction thereof.

21. A driving truck for rail cars and the like, comprising side members, a truck bolster mounted on the side members for movement about a pivot axis, driving axles rockably mounted at the front and rear ends of said side members, means serving as a torque arm connected with each axle and rockably mounted with respect to said side members with said axle, longitudinally disposed shaft means connected with one of said axles and carried by the associated torque arm means, means for driving said one axle comprising gear mechanism mounted on said torque arm means adjacent the inner end thereof and spaced from the pivot axis of the truck and a vertically disposed shaft section for driving said gear mechanism extending upwardly alongside but spaced from the axis of the truck, and means in the central portion of the truck to receive the reaction of both of said torque arm means.

ROBERT J. BURROWS.
ALFRED O. WILLIAMS.